US012717912B2

(12) United States Patent
Liu

(10) Patent No.: US 12,717,912 B2
(45) Date of Patent: Aug. 25, 2026

(54) METHOD, APPARATUS, DEVICE AND STORAGE MEDIUM FOR SEARCHING AND KILLING A FRONT-END PROCESS

(71) Applicant: Beijing Bytedance Network Technology Co., Ltd., Beijing (CN)

(72) Inventor: Chengcheng Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 384 days.

(21) Appl. No.: 18/443,572

(22) Filed: Feb. 16, 2024

(65) Prior Publication Data

US 2024/0231892 A1 Jul. 11, 2024

Related U.S. Application Data

(63) Continuation of application No. PCT/CN2022/105294, filed on Jul. 12, 2022.

(30) Foreign Application Priority Data

Sep. 26, 2021 (CN) .......................... 202111130175.0

(51) Int. Cl.
*G06F 21/56* (2013.01)
*G06F 9/48* (2006.01)

(52) U.S. Cl.
CPC .............. *G06F 21/56* (2013.01); *G06F 9/485* (2013.01)

(58) Field of Classification Search
CPC ................................. G06F 9/485; G06F 21/56
(Continued)

(56) References Cited

U.S. PATENT DOCUMENTS 9,338,522 B2 * 5/2016 Rajgopal ............ H04N 21/4437
10,437,999 B1 10/2019 Bhattacharyya et al.
(Continued)

FOREIGN PATENT DOCUMENTS

CN 106648863 5/2017
CN 108491722 9/2018
(Continued)

OTHER PUBLICATIONS

Williams JLP (2022) Investigating malware propagation and behaviour using system and network, pixel-based visualisation. SN Comput Sci 3(53) (Year: 2022).*
(Continued)

*Primary Examiner* — Jacob D Dascomb
(74) *Attorney, Agent, or Firm* — Fish & Richardson P.C.

(57) ABSTRACT

The disclosure relates to a method, apparatus, electronic device, storage medium, computer program product and computer program for searching and killing a front-end process at an electronic device. The electronic device includes a first operating system and a second operating system. The second operating system shares a kernel with the first operating system and is deployed in the first operating system. In the method, the electronic device obtains activity information sent by an activity of a front-end process of the second operating system. The electronic device obtains a pixel size of a view for the activity based on the activity information. The electronic device determines, based on the pixel size and a predetermined pixel threshold, whether the front-end process is a keep-alive process. In accordance with a determination that the front-end process is the keep-alive process, the electronic device shuts down the front-end process.

20 Claims, 2 Drawing Sheets

(58) Field of Classification Search
USPC ........................................................ 718/100
See application file for complete search history.

(56) References Cited

U.S. PATENT DOCUMENTS

| | | | |
|---|---|---|---|
| 10,621,343 B1 | 4/2020 | Maciejak et al. | |
| 2012/0110666 A1* | 5/2012 | Ogilvie | G06F 21/55 726/23 |
| 2018/0288167 A1 | 10/2018 | Dutta et al. | |
| 2018/0357413 A1 | 12/2018 | Rivera | |
| 2019/0102566 A1* | 4/2019 | Jung | G06F 9/545 |
| 2019/0286821 A1 | 9/2019 | Strogov et al. | |

FOREIGN PATENT DOCUMENTS

| | | |
|---|---|---|
| CN | 109766178 | 5/2019 |
| CN | 111488207 | 8/2020 |
| CN | 112445530 | 3/2021 |
| CN | 113139176 A | 7/2021 |
| CN | 113918933 | 1/2022 |
| WO | WO 2015081791 | 6/2015 |

OTHER PUBLICATIONS

K. S. Han, J. H. Lim, B. Kang, and E. G. Im, "Malware analysis using visualized images and entropy graphs," Int. J. Inf. Security, vol. 14, No. 1, pp. 1-14 (Year: 2015).*

Second Office Action for Chinese Application No. 202111130175.0, mailed Oct. 31, 2024, 12 pages (with English translation).

International Search Report and Written Opinion in International Appln. No. PCT/CN2022/105294, mailed on Oct. 10, 2022, 6 pages (with English translation).

Office Action in Chinese Appln. No. 202111130175.0, dated Apr. 19, 2024, 10 pages (with English translation).

* cited by examiner

METHOD, APPARATUS, DEVICE AND STORAGE MEDIUM FOR SEARCHING AND KILLING A FRONT-END PROCESS

CROSS REFERENCE TO RELATED APPLICATIONS

This application is a continuation application of, and claims priority to, PCT application PCT/CN2022/105294, filed on Jul. 12, 2022, which claims priority to Chinese Patent Application Ser. No. 202111130175.0 filed on Sep. 26, 2021, and entitled "METHOD, APPARATUS, DEVICE AND STORAGE MEDIUM FOR SEARCHING AND KILLING A FRONT-END PROCESS." The disclosure of the foregoing applications are incorporated here by reference.

BACKGROUND

Field

The present specification relates to the field of computer technologies, and more particularly to a method, apparatus, device, storage medium and computer program product for searching and killing a front-end process.

Background

In related technologies, normal interfaces in which various application processes reside, which, for example, are provided by Android® for applications, are becoming a new "protective umbrella" for malicious application developers. Developers have created a large number of rogue applications by keeping Android® processes alive maliciously. This not only brings serious consequences to users, such as expense loss and privacy leakage, but also leads to rapid battery consumption and stuck phenomena of mobile phone devices, etc., which destroys the user experience for using Android® devices.

In some Android® applications, some applications will initiate a front-end activity with a view size of 1 px (pixel) to keep alive, while Android® will not kill the front-end activity actively.

SUMMARY

This specification provides a method, apparatus, electronic device, non-transitory computer readable storage medium, computer program product and computer program for searching and killing a front-end process, solving the problem that the front-end process cannot be searched and killed in prior art, and realizing the searching and killing for the front-end process that kept alive maliciously.

In a first aspect, the present disclosure provides a method for searching and killing a front-end process. The method is applied to an electronic device. The electronic device includes a first operating system and a second operating system. The second operating system shares a kernel with the first operating system and is deployed in the first operating system. In the method, the electronic device obtains activity information sent by an activity of a front-end process of the second operating system. The electronic device obtains a pixel size of a view for the activity based on the activity information. The electronic device determines, based on the pixel size and a predetermined pixel threshold, whether the front-end process is a keep-alive process. In accordance with a determination that the front-end process is the keep-alive process, the electronic device shuts down the front-end process.

According to the method for searching and killing a front-end process provided by the present disclosure, determining, based on the pixel size and a predetermined pixel threshold, whether the front-end process is a keep-alive process comprises in accordance with a determination that the pixel size is less than or equal to the pixel threshold, determining that the front-end process is the keep-alive process.

According to the method for searching and killing a front-end process provided by the present disclosure, the pixel threshold is one pixel.

According to the method for searching and killing a front-end process provided by the present disclosure, the front-end process is created by the first operating system, and the activity is created by the second operating system.

According to the method for searching and killing a front-end process provided by the present disclosure, the first operating system and the second operating system share a Linux kernel.

According to the method for searching and killing a front-end process provided by the present disclosure, shutting down the front-end process comprises obtaining a process number of the front-end process and shutting down the front-end process based on the process number.

In a second aspect, the present disclosure provides an apparatus for searching and killing a front-end process. The apparatus is applied to an electronic device. The electronic device comprises a first operating system and a second operating system. The second operating system shares a kernel with the first operating system and is deployed in the first operating system. The apparatus comprises a first obtaining module, a second obtaining module, a determination module and a shutting-down module. The first obtaining module is configured to obtain activity information sent by an activity of a front-end process of the second operating system. The second obtaining module is configured to obtain a pixel size of a view for the activity based on the activity information. The determination module is configured to determine, based on the pixel size and a predetermined pixel threshold, whether the front-end process is a keep-alive process. The shutting-down module is configured to shut down the front-end process in accordance with a determination that the front-end process is the keep-alive process.

According to the apparatus for searching and killing a front-end process provided by the present disclosure, the determination module is further configured to determine that the front-end process is the keep-alive process in accordance with a determination that the pixel size is less than or equal to the pixel threshold.

According to the apparatus for searching and killing a front-end process provided by the present disclosure, the pixel threshold is one pixel.

According to the apparatus for searching and killing a front-end process provided by the present disclosure, the front-end process is created by the first operating system, and the activity is created by the second operating system.

According to the apparatus for searching and killing a front-end process provided by the present disclosure, the first operating system and the second operating system share a Linux® kernel.

According to the apparatus for searching and killing a front-end process provided by the present disclosure, the shutting-down module is further configured to obtain a process number of the front-end process; and shut down the front-end process based on the process number.

In a third aspect, the present disclosure further provides an electronic device comprising a memory, a processor, and a computer program that is stored on the memory and executable on the processor. The program, when executed by the processor, causes the electronic device to perform operations that implement the steps of the method for searching and killing a front-end process described above.

In a fourth aspect, the present disclosure further provides non-transitory computer-readable storage medium having a computer program stored thereon. The computer program, when executed by a processor, e.g., of one or more computing devices, causes the one or more computing devices to perform operations that implement the steps of the method for searching and killing a front-end process described above.

In a fifth aspect, the present disclosure further provides a computer program product, comprising a computer program. The computer program, when executed by a processor of one or more computing devices, causes the one or more computing devices to perform operations that implement the steps of the method for searching and killing a front-end process described above.

In a sixth aspect, the present disclosure further provides a computer program. The computer program, when executed by a processor, implements the steps of the method for searching and killing a front-end process described above.

The method, apparatus, electronic device, and non-transitory computer-readable storage medium for searching and killing a front-end process provided in this disclosure determines whether there is a keep-alive process based on a view pixel of an activity of the front-end process and a pixel threshold, and searches and kills the keep-alive process, which can achieve the monitoring for an application kept alive maliciously and achieve the purpose of protecting user rights and interests.

BRIEF DESCRIPTION OF DRAWINGS

In order to more clearly illustrate the technical solutions in this disclosure or prior art, a brief introduction will be made to the accompanying drawings required for the description of embodiments or prior art. Apparently, the accompanying drawings in the following description are some embodiments of this disclosure. For those skilled in the art, other drawings can be obtained based on these drawings without creative labor.

DETAILED DESCRIPTION

In order to make the purpose, technical solution, and advantages of the present disclosure clearer. The following will provide a clear and complete description of the technical solution of the present disclosure, in conjunction with specific embodiments and the corresponding drawings. Apparently, the described embodiments are only part of the embodiments of the present disclosure, not all embodiments. Based on the embodiments in the present disclosure, all other embodiments obtained by those skilled in the art without creative labor are within the scope of protection of the present disclosure.

In related technologies, Android® applications can start an activity with a view size of one pixel at the front-end of the operating system to keep the front-end process of the application alive. Due to the system design of Android®, front-end activities generally will not be killed actively, which leaves room for keeping the applications alive maliciously Many applications have achieved to keep alive under Android® by starting an activity with a view size of one pixel at the front-end.

To solve this problem, embodiments of the present disclosure provide a method, apparatus, electronic device, and non-transitory computer-readable storage medium for searching and killing a front-end process.

In conjunction with the accompanying drawings, the following describes the technical solutions provided by the various embodiments of the present disclosure in detail.

Figures 1, 2:
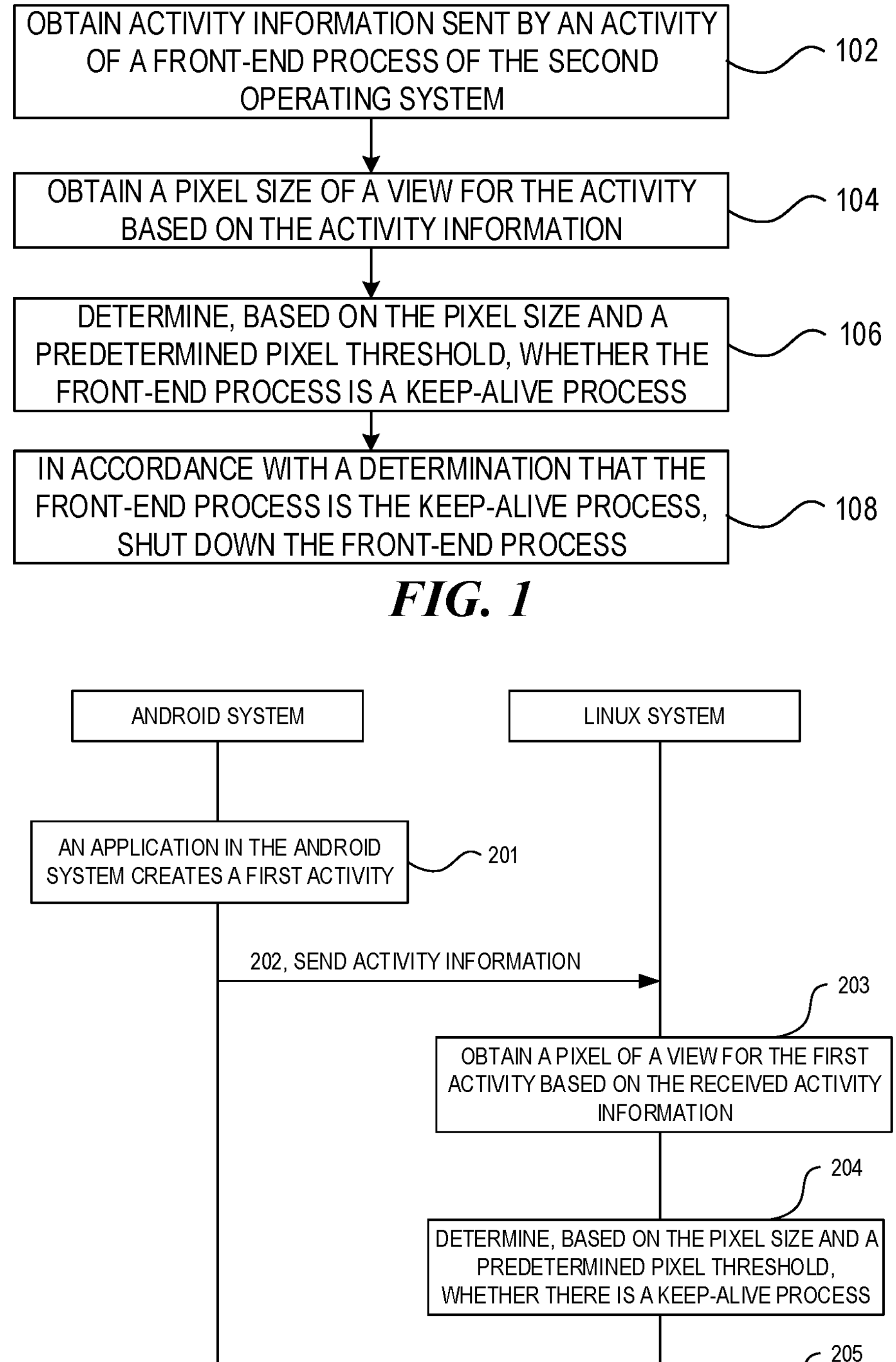
FIG. 1 is a flow diagram of a method for searching and killing a front-end process provided by the present specification.
FIG. 2 is a flow diagram of a method for searching and killing a front-end process provided by the present specification.

Shown in FIG. 1 is a flow diagram of a method for searching and killing a front-end process of the embodiments of the present disclosure. The method provided by the embodiments of the present disclosure may be performed by any electronic device having computer processing capability, such as tablets, mobile phones and other electronic devices.

In the embodiments of the present disclosure, a first operating system runs on the electronic device, and a second operating system that shares a kernel with the first operating system runs in the first operating system.

For example, the first operating system that is a host and the second operating system deployed in the first operating system shares a Linux® kernel, which is implemented by technologies, such as LXC, containerization and so on.

For example, the first operating system may be a variety of GNU/Linux® published versions, such as Ubuntu, Debian, RedHat, etc. It should be noted that the first operating system is not limited to run on a physical machine, and the first operating system may be hosted on other operating systems, such as WSL in a Windows system.

For example, the second operating system may be Android® operating system, including Android® OS and AOSP published by Google and various derivative systems based on AOSP, such as MIUI, EMUI, One UI, etc.

As those skilled in the art known, as an example of the second operating system, there are a variety of other Linux® Kernel-based mobile operating systems, such as Tizen, Harmony OS, Meego, etc., which are applicable to the embodiments of the present disclosure.

Although not explicitly described, those skilled in the art can understand that the first operating system and the second operating system can also be the same operating system. For example, another Android® operating system runs in the Android® system through container technology.

As shown in FIG. 1, the embodiments of the present disclosure provide a method for searching and killing a front-end process. The method includes the following step 102, step 104, step 106 and step 108.

In step 102, an electronic device obtains activity information sent by an activity of a front-end process of the second operating system.

The front-end process is a process that is currently displayed on a screen and interacts with a user. Although the number of the front-end processes in a system is small, such processes have the greatest impact on user experience. Only when memory of the system is too insufficient to maintain basic interaction with the user will the front-end process be destroyed. Therefore, such a process is of the highest importance. An activity (e.g. an object of Activity) is a component that can contain a user interface. It can be simply understood that one page corresponds to one activity and is mainly used for interaction with the user. The activity information refers to running information of the activity, which can be passed by ActivityInfo class.

Taking the Android® system as an example, an Activity is usually a separate screen in an application. The Activity represents a screen that the user can see, mainly used to process the overall work of an application, such as listening to a system event, displaying a specified View for the user, starting another Activity, etc. The Activities for all applications inherit from android.app.Activity class, which is a basic level class provided by Android®. After inheriting from the parent class, other Activities implement various functions through a method of the parent class.

The ActivityInfo class is an abstract base class used to create a composite activity from a pre-existing Activity object, which can be used to pass the activity information. The activity information about tracking contained in the ActivityInfo class is defined as follows:

public ref class ActivityInfo sealed

[System. Runtime. Serialization. DataContract]

public sealed class ActivityInfo

[<System. Runtime. Serialization. DataContract>]

type ActivityInfo=class

Public NotInheritable Class ActivityInfo

The inheritance of the ActivityInfo class is: Object→ActivityInfo, and the property is: DataContractAttribute.

A constructor function of the ActivityInfo class is:

ActivityInfo(String, String, String, String), which represents initializing a new instance of the ActivityInfo class with a specified name, an ID, an instance ID, and a type name.

Properties of the ActivityInfo class are as follows:

Id: obtaining an ID of an activity.

InstanceId: obtaining a runtime ID of an activity instance.

Name: obtaining a name associated with an activity.

TypeName: obtaining a type name of an activity.

Methods of the ActivityInfo class comprise:

Equals(Object): determining whether the specified object is equal to a current object (inherited from Object).

GetHashCode( ): as a default hash function (inherited from Object).

GetType( ): obtaining a current instance (inherited from Object).

MemberwiseClone( ): creating a shallow copy of a current Object (inherited from Object).

ToString( ): obtaining a string representation form of an ActivityInfo object.

In step 104, the electronic device obtains a pixel size of a view for the activity based on the activity information.

The pixel size of the view for the activity is a pixel size of a display window for the activity. When designing a keep-alive process, the display window for the activity is generally designed to be transparent. At this time, the display window for the activity is not visible to naked eyes but can be detected by the operating system.

In step 106, the electronic device determines, based on the pixel size and a predetermined pixel threshold, whether the front-end process is a keep-alive process.

Specifically, in the keep-alive process, the size of the activity is generally designed to be one pixel, and it is transparent without switching animations. However, in normal operation of a program, it is impossible to have an activity of one pixel. The pixel threshold is designed to be one pixel, and the current size of the activity is compared with one pixel, which can determine whether the current process is the keep-alive process.

In step 108, if the front-end process is the keep-alive process, the electronic device shuts down the front-end process.

Specifically, if the pixel size of the view for the current activity is less than or equal to one pixel, the process in which the current activity lies is the keep-alive process, and therefore that process can be destroyed and shut down. If the size of the current activity is greater than one pixel, there is no need to handle the process in which the current activity lies.

In the embodiments of the present disclosure, the pixel size of the activity is compared with the predetermined pixel threshold, and in accordance with a determination that the pixel size is less than the pixel threshold, it is determined that there is a front-end keep-alive process, and therefore the front-end keep-alive process can be killed.

In step 106, in accordance with a determination that the pixel size is less than or equal to the pixel threshold, the front-end process is determined to be the keep-alive process.

In the embodiments of the present disclosure, the pixel threshold may be one pixel, but is not limited thereto, for example, the pixel threshold may be two pixels.

In the embodiments of the present disclosure, as an example, the first operating system is Linux®, and the second operating system is Android®. The activity is created by Android®, and its front-end process is created and managed by Linux®.

In step 108, shutting down the keep-alive process comprises obtaining a process number of the front-end process; and shutting down the front-end process based on the process number.

In the embodiments of the present disclosure, the view size of the front-end activity of the application in the second operating system is monitored by the first operating system. If the pixel of the view is found to be too small, the front-end activity and the process in which the activity lies can be killed, thereby solving the problem that Android® and other systems do not actively kill a front-end activity and realizing the searching and killing for the front-end process that is kept alive maliciously.

Taking Linux® and Android® as examples, during the running process of an Android® App (Android® application), the activity of the front-end process will send its own information to the Linux®. The Linux® obtains that activity information, directly obtains pixel information, such as the width and height, from info (information) of the activity, and determines the size of the activity based on the pixel information. If the activity is too small, for example, the view size of the activity is one pixel, the Linux® call kill (killing) method to kill the process in which the activity lies.

The kill herein is a killing method that comes with the Linux®, and its usage mode can be kill plus the process number.

In the embodiments of the present disclosure, the first operating system (e.g., Linux® system) is responsible for managing the application process in the second operating system (e.g., Android®), including creating and destroying the process. The second operating system is responsible for creating and displaying the activity of the application and sending the activity information to the first operating system. The first operating system can obtain information, such as the size of the front-end activity for the application of the second operating system. When activity information is obtained and the size of the view for that activity is determined to be less than or equal to the predetermined pixel threshold, the kill method can be called to kill the process for the corresponding application.

When the first operating system is the Linux® system and the second operating system is the Android® system, as shown in FIG. 2, the method for searching and killing a front-end process in the embodiments of the present disclosure comprises the following steps:

In step 201, an application in the Android® system creates a first activity.

In step 202, the Android® system sends activity information of the first activity to the Linux® system.

In step 203, the Linux® system obtains a pixel size of a view for the first activity based on the received activity information.

In step 204, the Linux® system determines, based on the pixel size and a predetermined pixel threshold, whether there is a keep-alive process.

In step 205, in accordance with a determination that there is the keep-alive process, the Linux® system kills the process of the application in which the first activity lies.

Specifically, a task manager (ActivityManager) in the Android® system can obtain information, such as the content of a running program. The role of the ActivityManager is to provide an interactive interface for all running Activity in the system, wherein a main interface is directed to process information, task information, service information, etc. The returned list is arranged in order, which means that the first one will run after the second one doubtlessly. A getRunningTasks has an integer parameter indicating the maximum number of the returned list. If we input 1 into it as a parameter, the task returned by it is the currently running task, and then the top-level activity is obtained from the task, this activity being the activity currently displayed to the user exactly. The process to obtain the currently displayed activity is shown as the following code:

```
ActivityManager am
=(ActivityManager) getSystemService (ACTIVITY_
    SERVICE);
ComponentName cn=am.getRunningTasks(1).get(0).
    topActivity;
Log.d (" ", "pkg:"+cn.getPackageName( ));
Log.d (" ", "cls:"+cn.getClassName( ));
```

The Android® system obtains package information PackageInfo of the application, and then can obtain all the ActivityInfo lists in Manifest.xml. An AndroidManifest.xml file describes a basic characteristic of the application and each component, which can be used as an interface between the Android® system and the application.

In step 202, the Android® system sends the activity information of the first activity to the Linux® system. Specifically, the activity information of the first activity can be sent through socket communication.

For ease of understanding, the code for the first activity of one pixel for a keep-alive process is provided below:

```
public class MainActivity extends AppCompatActivity {
private static final String TAG = "MainActivity";
@Override
protected void onCreate(Bundle savedInstanceState) {
super.onCreate(savedInstanceState);
Window window=getWindow( );
window.setGravity(Gravity.LEFT|Gravity.TOP);
WindowManager.LayoutParams layoutParams
=window.getAttributes( );
layoutParams.x=0;
layoutParams.y=0;
layoutParams.width=1;
layoutParams.height=1;
layoutParams.type=WindowManager.LayoutParams.TYPE_PHONE;
layoutParams.flags=WindowManager.LayoutParams.FLAG_NOT_TOUCH MOD
AL;
window.setAttributes(layoutParams);
Log.e(TAG, "onCreate:display);
}
}
```

ActivityManager calls a getRunningServices( ) function, but instead of implementing this function itself, it calls a getServices( ) function of an ActivityManagerProxy proxy class, which is a proxy class of an ActivityManagerNative. Both classes implement the ActivityManager interface, which is a structure of a proxy pattern. When calling the getServices( ) function of the ActivityManagerProxy proxy class, a corresponding function in the ActivityManagerNative will be called. Instead of implementing a specific function actually, that class calls the getServices( ) function in the ActivityManagerService through a Binder process communication mechanism, and the specific function is realized in the ActivityManagerService.

All currently running tasks, processes, and services can be obtained from ActivityManager, through which the currently displayed activity can be obtained.

For all "running" tasks in the system, the "running" state comprises a task that has been frozen by the system. This As can be seen from this code, the width and height of the first activity are both set to one pixel, that is, the pixel size of the first activity is one pixel. The pixel size information of the first activity is recorded in the ActivityInfo and sent to the Linux® system.

In step 203, the Linux® system parses the activity information, and the size of the first activity can be obtained as one pixel. In step 204 and step 205, the first activity can be determined as the activity of the keep-alive process based on the pixel size of the first activity and the pixel threshold, and the determination result is YES. In step 205, the Linux® system kills the process in which the first activity lies.

The kill command is used to terminate a specified process and is a common command for process management under Unix/Linux®. When there is a need to terminate some process(es), the Linux® system usually uses a tool, such as ps/pidof/pstree/top first to obtain a process PID, and then uses the kill command to kill that process. Another usage of the kill command is to send a signal to a specified process or process group, or to determine whether the process with the process number PID still exists. For example, many programs use a SIGHUP signal as a trigger condition for rereading a configuration file.

Format: kill<pid>8,

Format: kill-TERM<pid>

Send the SIGTERM signal to the specified process. If the process does not capture the signal, the process terminates.

Format: kill-1

List all signal names. Only the 9th kind of signal (SIGKILL) can terminate the process unconditionally, and the process has the right to ignore other signals. The following are commonly used signals:

HUP 1 terminal disconnection

INT 2 interrupt (same as Ctrl+C)

QUIT 3 exit (same as Ctrl+\)

TERM 15 termination

KILL 9 mandatory termination

CONT 18 continue (as opposed to STOP, the fg/bg command)

STOP 19 suspension (same as Ctrl+Z).

Format: kill-1<signame>

Display the numerical value of a specified signal.

Format: kill-9<pid>

Format: kill-KILL<pid>

Force to kill a specified process and terminate a specified process unconditionally.

Format: kill %<jobid>

Format: kill-9%<jobid>

Kill a specified task (can be listed using a jobs command).

The following describes an apparatus for searching and killing a front-end process provided by the present disclosure. The apparatus for searching and killing a front-end process described below and the method for searching and killing a front-end process described above can be mutually referenced.

Figure 3:
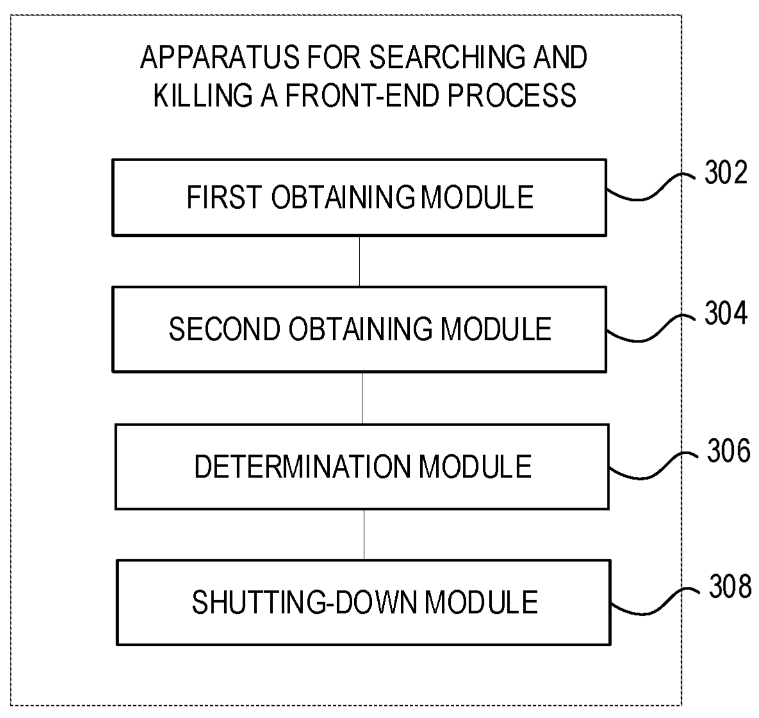
FIG. 3 is a schematic diagram of a structure of an apparatus for searching and killing a front-end process provided by the present specification.

As shown in FIG. 3, an apparatus for searching and killing a front-end process provided by the embodiments of the present disclosure is applied to an electronic device. The electronic device comprises a first operating system and a second operating system. The second operating system shares a kernel with the first operating system and is deployed in the first operating system. The apparatus for searching and killing includes: a first obtaining module 302, a second obtaining module 304, a determination module 306 and a shutting-down module 308. The first obtaining module 302 is configured to obtain activity information sent by an activity of a front-end process of the second operating system. The second obtaining module 304 is configured to obtain a pixel size of a view for the activity based on the activity information. The determination module 306 is configured to determine, based on the pixel size and a predetermined pixel threshold, whether the front-end process is a keep-alive process. The shutting-down module 308 is configured to shut down the front-end process in accordance with a determination that the front-end process is the keep-alive process.

In the embodiments of the present disclosure, the pixel size of the activity is compared with the predetermined pixel threshold. In accordance with a determination that the pixel size is less than the pixel threshold, it is determined that there is a front-end keep-alive process, and therefore the front-end keep-alive process can be killed.

In the embodiments of the present disclosure, the determination module is further configured to, in accordance with a determination that the pixel size is less than or equal to the pixel threshold, determine that the front-end process is the keep-alive process.

In the embodiments of the present disclosure, the pixel threshold may be one pixel, but is not limited thereto, for example, the pixel threshold may be two pixels.

In the embodiments of the present disclosure, the front-end process is created by the first operating system, and the activity is created by the second operating system.

In the embodiments of the present disclosure, the first operating system and the second operating system share a Linux® kernel.

Pixel size information of the first activity is recorded in ActivityInfo and sent to the Linux® system.

The Android® system sends the activity information of the first activity to the Linux® system. Specifically, the Android® system can send the activity information of the first activity to the Linux® system through socket communication.

In the embodiments of the present disclosure, the shutting-down module is further configured to obtain a process number of the front-end process; and shut down the front-end process based on the process number.

Taking Linux® and Android® as examples, during the running process of an Android® App, the activity of the front-end process will send its own information to the Linux®. The Linux® obtains that activity information, directly obtains pixel information, such as the width and height, from info (information) of the activity, and determines the size of the activity based on the pixel information. If the activity is too small, for example, the view size of the activity is one pixel, the Linux® call kill method to kill the process in which the activity lies. The kill herein is a killing method that comes with the Linux®, and its usage mode can be kill+the process number.

The apparatus for searching and killing may be located in the Linux® system, and the Linux® system obtains a pixel size of a view for the first activity based on the received activity information. The Linux® system determines, based on the pixel size and a predetermined pixel threshold, whether there is a keep-alive process. In accordance with a determination that there is the keep-alive process, the Linux® system kills the process of the application in which the first activity lies.

Specifically, the Linux® system is responsible for managing a process of an Android® application, including creating and destroying the process. Destroying the process means killing or shutting down the process. The Linux® can obtain information, such as the size of an Android® front-end activity. The Android® system is responsible for the creation and reality of the activity and sending the activity information to the Linux® system.

When the Linux® obtains the activity information for the Android® and determines that the size of the view for that activity is less than or equal to the predetermined pixel threshold, the kill method can be called to kill the process of that Android® application.

It will be appreciated, the above apparatus for searching and killing a front-end process enables to implement the various steps of the method for searching and killing a front-end process provided in the foregoing embodiments. The relevant explanation of the method for searching and killing a front-end process is applicable to the apparatus for searching and killing a front-end process, which is not repeated herein.

The apparatus for searching and killing a front-end process in the embodiments of the present disclosure determines whether there is the keep-alive process based on the pixels of the view for the activity of the front-end process and the pixel threshold value and search and kill the keep-alive process, which can achieve to monitor the Android® application that is kept alive maliciously, to achieve the purpose of protecting the rights and interests of users.

Figure 4:
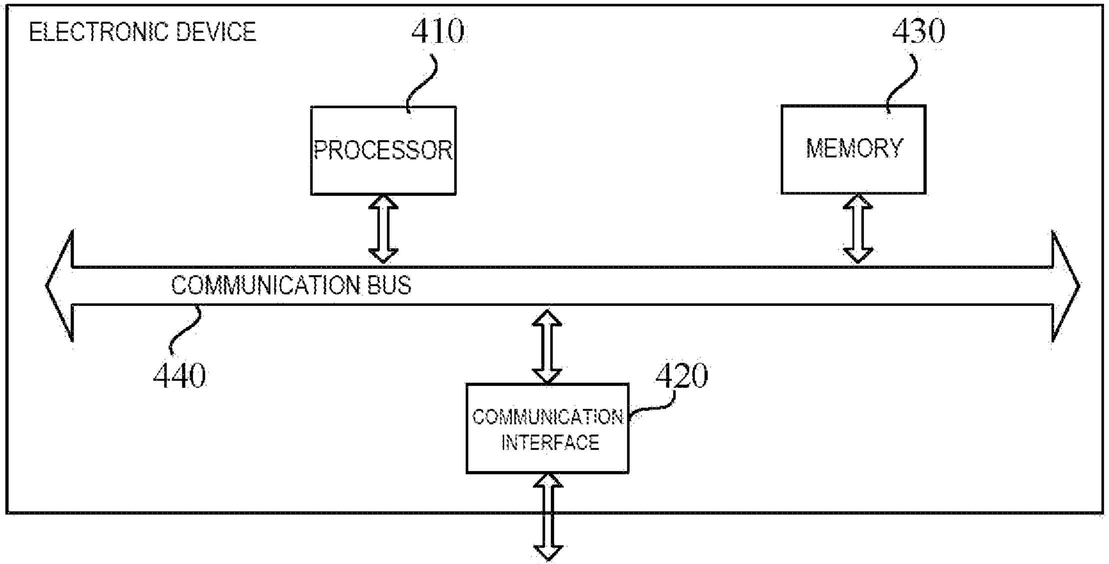
FIG. 4 is a schematic diagram of a structure of an electronic device provided by the present specification.

FIG. 4 illustrates a schematic diagram of an entity structure of an electronic device. As shown in FIG. 4, the electronic device may include a processor 410, a communication interface 420, a memory 430, and a communication bus 440. The processor 410, the communication interface 420, and the memory 430 communicate with each other through the communication bus 440. The processor 410 may call logical instructions in the memory 430 to perform a method for searching and killing a front-end process. The method may be applied to an electronic device. The electronic device comprises a first operating system and a second operating system. The second operating system shares a kernel with the first operating system and is deployed in the first operating system. In the method, the electronic device obtains activity information sent by an activity of a front-end process of the second operating system. The electronic device obtains a pixel size of a view for the activity based on the activity information. The electronic device then determines, based on the pixel size and a predetermined pixel threshold, whether the front-end process is a keep-alive process. In accordance with a determination that the front-end process is the keep-alive process, the electronic device shuts down the front-end process.

In addition, the logical instructions in the above-mentioned memory 430 can be implemented in the form of software functional units and can be stored in a computer-readable storage medium when sold or used as an independent product. Based on this understanding, the technical solution of the present disclosure can be embodied in the form of a software product, which is stored in a storage medium and includes several instructions to enable a computer device (which can be a personal computer, server, or network device, etc.) to execute all or part of the steps of the methods described in various embodiments of the present disclosure. The aforementioned storage media include U disk, mobile hard disk, Read-Only Memory (ROM), Random Access Memory (RAM), magnetic disk or optical disk, and other media that can store program code.

On the other hand, the present disclosure also provides a computer program product, the computer program product comprising a computer program stored on a non-transitory computer-readable storage medium, the computer program comprising program instructions. When the program instructions are executed by a computer, the computer can perform the method for searching and killing a front-end process provided by the above methods. The method is applied to an electronic device. The electronic device comprises a first operating system and a second operating system. The second operating system shares a kernel with the first operating system and is deployed in the first operating system. In the method, the computer obtains activity information sent by an activity of a front-end process of the second operating system. The computer obtains a pixel size of a view for the activity based on the activity information; The computer then determines, based on the pixel size and a predetermined pixel threshold, whether the front-end process is a keep-alive process. In accordance with a determination that the front-end process is the keep-alive process, the computer shuts down the front-end process.

On the other hand, the present disclosure also provides a non-transitory computer-readable storage medium having a computer program stored thereon. The computer program, when executed by a processor, causes an electric device to perform the method for searching and killing a front-end process provided above. The method is applied to an electronic device. The electronic device includes a first operating system and a second operating system. The second operating system shares a kernel with the first operating system and is deployed in the first operating system. In the method, the electric device obtains activity information sent by an activity of a front-end process of the second operating system. The electric device obtains a pixel size of a view for the activity based on the activity information. The electric device determines, based on the pixel size and a predetermined pixel threshold, whether the front-end process is a keep-alive process. In accordance with a determination that the front-end process is the keep-alive process, the electric device shuts down the front-end process.

The apparatus embodiments described above are merely illustrative, wherein the modules described as separate components may or may not be physically separated, the components that is a display module may or may not be physical module, i.e., may be located in one place, or may be distributed across a plurality of network units. Some or all of the modules may be selected according to actual needs to achieve the purpose of the present embodiment. Those of ordinary skill in the art can understand and implement without creative labor.

Through the description of the above embodiments, those skilled in the art can clearly understand that each embodiment can be implemented by means of software plus a necessary universal hardware platform, of course, it can also be implemented by hardware. Based on this understanding, the above technical solution essentially or part that contributes to prior art can be embodied in the form of a software product, which can be stored in a computer-readable storage medium such as ROM/RAM, magnetic disk, optical disk, etc., including several instructions for causing a computer device (which can be a personal computer, server, or network device, etc.) to execute certain parts of the various embodiments or embodiments.

Finally, it should be noted that: the above embodiments are only used to illustrate the technical solutions of the present disclosure, and not to limit thereto; although the present disclosure has been described in detail with reference to the foregoing embodiments, those of ordinary skill in the art should understand that: it is still possible to the foregoing embodiments technical solutions described modifications, or equivalents of some of the technical features; and these modifications or substitutions, do not make the essence of the corresponding technical solutions from the spirit and scope of the embodiments of the present disclosure.

What is claimed is:

1. A method for searching and killing a front-end process, comprising:

obtaining, at an electronic device comprising a first operating system and a second operating system, activity information sent by an activity of the front-end process of the second operating system;

obtaining a pixel size of a view for the activity based on the activity information;

determining, based on the pixel size and a predetermined pixel threshold, whether the front-end process is a keep-alive process; and in accordance with a determination that the front-end process is the keep-alive process, shutting down the front-end process, wherein the second operating system shares a kernel with the first operating system and is deployed in the first operating system.

2. The method of claim 1, wherein determining, based on the pixel size and a predetermined pixel threshold, whether the front-end process is a keep-alive process comprises:

in accordance with a determination that the pixel size is less than or equal to the pixel threshold, determining that the front-end process is the keep-alive process.

3. The method of claim 1, wherein the pixel threshold is one pixel.

4. The method of claim 1, wherein the front-end process is created by the first operating system, and the activity is created by the second operating system.

5. The method of claim 1, wherein the first operating system and the second operating system share a Linux kernel.

6. The method of claim 1, wherein shutting down the front-end process comprises:

obtaining a process number of the front-end process; and shutting down the front-end process based on the process number.

7. The method of claim 1, wherein the first operating system is a Linux system, and the second operating system is an Android system.

8. An electronic device comprising a memory, a processor, and a computer program that is stored on the memory and executable on the processor, wherein the program, when executed by the processor, causes the electronic device to perform operations comprising:

obtaining, at the electronic device comprising a first operating system and a second operating system, activity information sent by an activity of a front-end process of the second operating system;

obtaining a pixel size of a view for the activity based on the activity information;

determining, based on the pixel size and a predetermined pixel threshold, whether the front-end process is a keep-alive process; and in accordance with a determination that the front-end process is the keep-alive process, shutting down the front-end process, wherein the second operating system shares a kernel with the first operating system and is deployed in the first operating system.

9. The electronic device of claim 8, wherein determining, based on the pixel size and a predetermined pixel threshold, whether the front-end process is a keep-alive process comprises:

in accordance with a determination that the pixel size is less than or equal to the pixel threshold, determining that the front-end process is the keep-alive process.

10. The electronic device of claim 8, wherein the pixel threshold is one pixel.

11. The electronic device of claim 8, wherein the front-end process is created by the first operating system, and the activity is created by the second operating system.

12. The electronic device of claim 8, wherein the first operating system and the second operating system share a Linux kernel.

13. The electronic device of claim 8, wherein shutting down the front-end process comprises:

obtaining a process number of the front-end process; and shutting down the front-end process based on the process number.

14. The electronic device of claim 8, wherein the first operating system is a Linux system, and the second operating system is an Android system.

15. A non-transitory computer-readable storage medium having a computer program stored thereon, wherein the computer program, when executed by a processor, causes an electronic device to perform operations comprising:

obtaining, at the electronic device comprising a first operating system and a second operating system, activity information sent by an activity of a front-end process of the second operating system;

obtaining a pixel size of a view for the activity based on the activity information;

determining, based on the pixel size and a predetermined pixel threshold, whether the front-end process is a keep-alive process; and in accordance with a determination that the front-end process is the keep-alive process, shutting down the front-end process, wherein the second operating system shares a kernel with the first operating system and is deployed in the first operating system.

16. The non-transitory computer-readable storage medium of claim 15, wherein determining, based on the pixel size and a predetermined pixel threshold, whether the front-end process is a keep-alive process comprises:

in accordance with a determination that the pixel size is less than or equal to the pixel threshold, determining that the front-end process is the keep-alive process.

17. The non-transitory computer-readable storage medium of claim 15, wherein the pixel threshold is one pixel.

18. The non-transitory computer-readable storage medium of claim 15, wherein the front-end process is created by the first operating system, and the activity is created by the second operating system.

19. The non-transitory computer-readable storage medium of claim 15, wherein the first operating system and the second operating system share a Linux kernel.

20. The non-transitory computer-readable storage medium of claim 15, wherein shutting down the front-end process comprises:

obtaining a process number of the front-end process; and shutting down the front-end process based on the process number.

* * * * *